United States Patent
Shaffer et al.

(10) Patent No.: US 8,189,761 B2
(45) Date of Patent: May 29, 2012

(54) METHOD AND SYSTEM FOR MANAGING CALLS

(75) Inventors: Shmuel Shaffer, Palo Alto, CA (US); Mohammed I. Darwish, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 1446 days.

(21) Appl. No.: 11/725,065

(22) Filed: Mar. 15, 2007

(65) Prior Publication Data

US 2008/0226059 A1    Sep. 18, 2008

(51) Int. Cl.
*H04M 3/00* (2006.01)

(52) U.S. Cl. ......... 379/266.05; 379/266.02; 379/266.03; 379/266.04; 379/266.06; 379/266.07; 379/265.01; 379/265.11; 379/265.12

(58) Field of Classification Search ............. 379/265.01, 379/265.02, 265.05–265.08, 265, 266.03; 709/226; 705/11

See application file for complete search history.

(56) References Cited

U.S. PATENT DOCUMENTS

| | | | |
|---|---|---|---|
| 5,784,452 A * | 7/1998 | Carney | 379/265.06 |
| 5,828,747 A | 10/1998 | Fisher et al. | 379/265.12 |
| 5,864,617 A * | 1/1999 | Donnelly | 379/266.07 |
| 6,052,460 A | 4/2000 | Fisher et al. | 379/265.12 |
| 6,272,544 B1 * | 8/2001 | Mullen | 709/226 |
| 6,337,905 B1 | 1/2002 | Mizuta et al. | 379/265.02 |
| 6,356,632 B1 | 3/2002 | Foster et al. | 379/265.04 |
| 6,366,666 B2 * | 4/2002 | Bengtson et al. | 379/265.06 |
| 6,370,574 B1 * | 4/2002 | House et al. | 709/224 |
| 6,463,346 B1 * | 10/2002 | Flockhart et al. | 700/102 |
| 6,493,695 B1 | 12/2002 | Pickering et al. | 706/47 |
| 6,512,825 B1 | 1/2003 | Lindholm et al. | 379/266.01 |
| 6,650,748 B1 | 11/2003 | Edwards et al. | 379/266.04 |
| 6,714,643 B1 | 3/2004 | Gargeya et al. | 379/266.06 |
| 6,748,072 B1 | 6/2004 | McGraw et al. | 379/265.03 |
| 6,845,155 B2 | 1/2005 | Elsey | 379/266.04 |
| 2001/0056367 A1 * | 12/2001 | Herbert et al. | 705/11 |

(Continued)

FOREIGN PATENT DOCUMENTS

DE    103 09 791 A1    9/2004

(Continued)

OTHER PUBLICATIONS

"Avaya Tenovis; Call Center; Features & Benefits," Avaya Menus, http://www.avaya.fr/Produits/Call_Center/feature%20benefits/features_benefits.asp?print=yes, 2 pages, 2003.

(Continued)

*Primary Examiner* — Joseph J Nguyen
(74) *Attorney, Agent, or Firm* — Baker Botts L.L.P.

(57) ABSTRACT

A method for managing calls includes allocating a plurality of agents among a plurality of queues, receiving a plurality of calls each for connection with at least one of the plurality of agents, and assigning each of the plurality of calls to a queue of the plurality of queues. The method further includes monitoring a dynamic value profile for each of the plurality of queues. The dynamic value profile for a queue is calculated based on one or more financial attributes of the current calls in the queue. The method includes determining that the dynamic value profile for a first queue is greater than the dynamic value profile for a second queue. In addition, the method comprises reallocating one or more of the plurality of agents, among the plurality of queues in response to determining that the dynamic value profile for the first queue is greater than the dynamic value profile for the second queue.

26 Claims, 3 Drawing Sheets

U.S. PATENT DOCUMENTS

| | | | |
|---|---|---|---|
| 2002/0006192 A1* | 1/2002 | Bengtson et al. | 379/265.02 |
| 2005/0195960 A1* | 9/2005 | Shaffer et al. | 379/265.02 |
| 2007/0127690 A1* | 6/2007 | Patakula et al. | 379/265.05 |
| 2008/0075268 A1* | 3/2008 | Medina et al. | 379/265.06 |

FOREIGN PATENT DOCUMENTS

| | | | |
|---|---|---|---|
| EP | 0 647 050 | A2 | 4/1995 |
| EP | 0 863 651 | A2 | 9/1998 |
| EP | 0 647 050 | A3 | 1/1999 |
| EP | 0 863 651 | A3 | 4/1999 |
| EP | 1 011 256 | A2 | 6/2000 |
| EP | 1 091 307 | A2 | 4/2001 |
| EP | 1 091 307 | A3 | 8/2001 |
| EP | 1 011 256 | A3 | 8/2003 |

OTHER PUBLICATIONS

PCT, International Search Report and Written Opinion (ISA/EPO)dated Aug. 16, 2006 for PCT/US2006/013759, 12 pages.

Shaffer, et al.; "Method and System for Distributing Calls;" U.S. Appl. No. 11/114,431, filed Apr. 26, 2005; 43 pgs.

PCT, International Search Report and Written Opinion (ISA/EPO)dated Aug. 16, 2006 for PCT/US2006/013675, 13 pages.

Shaffer, et al.; "Method and System for Handling Calls at an Automatic Call Distribution System;" U.S. Appl. No. 11/114,599, filed Apr. 25, 2005; 47 pgs.

* cited by examiner

METHOD AND SYSTEM FOR MANAGING CALLS

TECHNICAL FIELD OF THE INVENTION

This invention relates in general to communication systems and, more particularly, to a method and system for managing calls.

BACKGROUND OF THE INVENTION

Automatic call distributors (ACDs) and other contact or call centers typically include specialized systems designed to match incoming requests for service, for example a telephone call or an e-mail, with a resource that is able to provide that service, for example a human call center agent. ACDs generally perform one or more of the following functions: (i) recognize and answer incoming contacts; (ii) review database(s) for instructions on what to do with a particular contact; (iii) receive caller input regarding the contact; (iv) use the instructions and input to identify an appropriate agent and queue the contact, often times providing a prerecorded message; and (v) connect the contact to an agent as soon as the agent is available.

Hosted ACD contact centers enable agents to provide increased level of customer service, increased revenue opportunities, and decreased cost of service and capital expenditures. The service includes providing equipment, agents, and supervisors to handle incoming calls on behalf of customers (clients). Hosted ACD call centers enable customers to focus on their core business while reducing capital expenditures and freeing them from the hassle of managing call center resources (e.g., agents, and equipment). Such hosted centers may provide equipment, agents, and supervisors to handle incoming calls on behalf of customers (clients). As part of the contract between the hosted ACD service provider and their clients, a service level agreement (SLA) may be negotiated. One key aspect of the SLA is meeting predetermined service level goals (SLGs) or targets such as answering a specified percent of incoming calls within a predetermined time (e.g., 80% of incoming calls must be answered within 20 second). The ACD operator may be paid in accordance with its ability to meet the agreed upon SLA.

Hosted ACD software typically handles incoming calls according to a fixed SLG for each service queue (SQ). Further, such calls are typically handled according to a linear first in first out (FIFO) algorithm. To accommodate high priority or value calls, some hosted ACD systems may provide priority queues for important customers. Additionally, while more sophisticated systems may provide dynamic resizing of agent pools, callers are serviced in accordance with a statically programmed SLG. Thus, hosted ACD service providers may have to sacrifice maximizing bottom line value for a call center in order to meet the SLG for a queue.

SUMMARY OF THE INVENTION

The present invention provides a method and system for managing calls that substantially eliminates or reduces at least some of the disadvantages and problems associated with previous methods and systems.

In accordance with a particular embodiment a method for managing calls includes allocating a plurality of agents among a plurality of queues, receiving a plurality of calls each for connection with at least one of the plurality of agents, and assigning each of the plurality of calls to a queue of the plurality of queues. The method also includes monitoring a dynamic value profile for each of the plurality of queues. The dynamic value profile for a queue is calculated based on one or more attributes of the current calls in the queue. In an example embodiment, the attributes may be financial attributes such as cost per call, revenue per call, sales volume, and/or legal risk. The method further includes determining that the dynamic value profile for a first queue is greater than the dynamic value profile for a second queue. In addition, the method comprises reallocating one or more of the plurality of agents, among the plurality of queues in response to determining that the dynamic value profile for the first queue is greater than the dynamic value profile for the second queue.

In a more particular embodiment, the method further includes monitoring a service level goal associated with one or more of the plurality of queues. The method may include adjusting the service level goal in response to reallocating one or more of a plurality of agents. Similarly, the method may include determining that the service level goal is not satisfied and reallocating one or more of the plurality of agents in response to determining that the service level goal is not satisfied.

In accordance with another embodiment, a system for managing calls includes an interface operable to receive a plurality of calls for connection with at least one of a plurality of agents and a distributor coupled to the interface and operable to distribute the plurality of calls to the plurality of agents. The system also includes a processor coupled to the distributor and operable to allocate a plurality of agents among a plurality of queues and assign each of the plurality of calls to a queue of the plurality of queues. The processor is also operable to monitor a dynamic value profile for each of the plurality of queues. The dynamic value profile for a queue is calculated based on one or more financial attributes of the current calls in the queue. The processor is also operable to determine that the dynamic value profile for a first queue is greater than the dynamic value profile for a second queue.

The processor is also functional to reallocate one or more of the plurality of agents among the plurality of queues in response to determining that the dynamic value profile for the first queue is greater than the dynamic value profile for the second queue.

Technical advantages of particular embodiments include providing an ability to reallocate agents associated with a call center to satisfy particular business goals of the call center. For example, agents may be reallocated based on one or more financial attributes associated with a particular queue such as revenue per call, cost per call, legal risk, or sales volume. Accordingly, particular systems and methods may enable a call center to maximize the business value produced by the call center.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings in which.

DETAILED DESCRIPTION OF THE INVENTION

Figure 1:
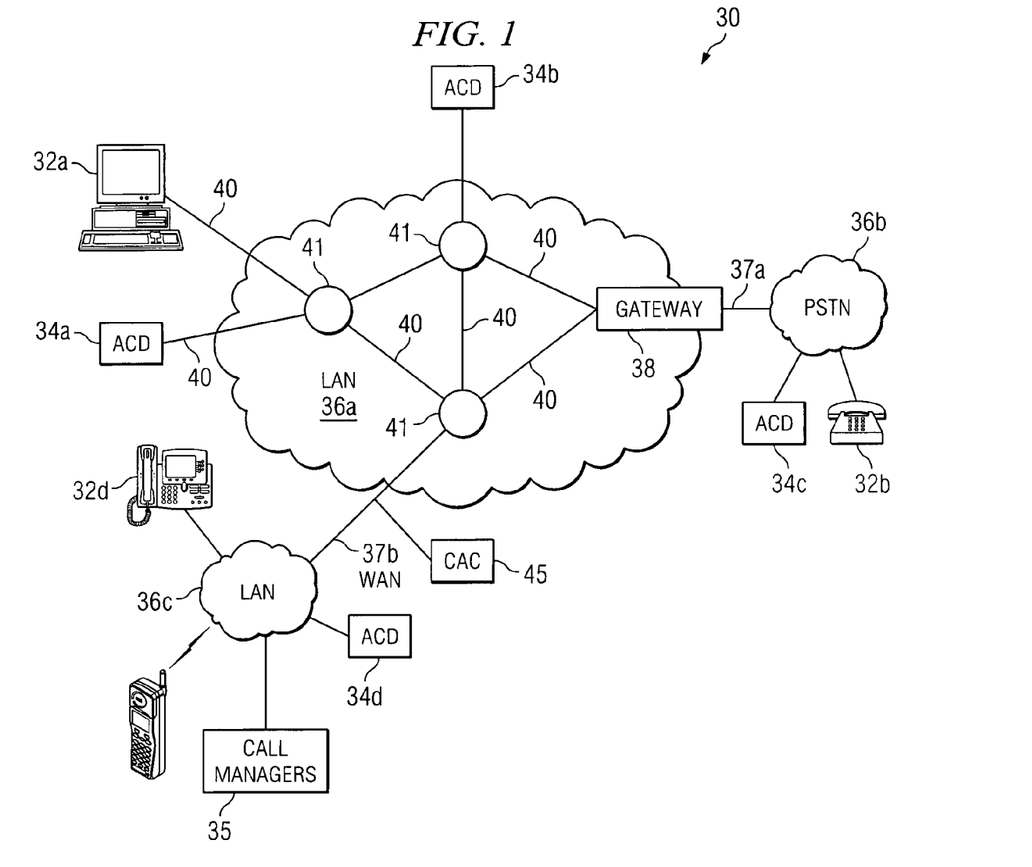
FIG. 1 is a simplified block diagram illustrating a communication system including a plurality of endpoints operable to communicate among each other and a plurality of automatic call distributors in accordance with a particular embodiment of the present invention.

FIG. 1 illustrates a communication system 30 including a plurality of endpoints 32a-32d having the ability to establish communication sessions between each other and/or automatic call distributors (ACDs) 34a-34d, using one or more of communication networks 36a-36c. ACDs 34a-34d are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls. "Calls" shall include requests for service transmitted using any audio and/or video means, including signals, data or messages transmitted through voice devices, text chat, web sessions, facsimile, instant messaging and e-mail. ACDs 34a-34d may comprise hosted or non-hosted call centers. In certain embodiments, ACDs 34a-34d may include outsourced call centers or other contact centers that receive incoming customer calls for distribution to agents and that place calls from agents to customers.

In accordance with particular embodiments, ACDs 34a-34d may assign incoming calls to queues for connection with an agent and reallocate agents in response to determining that a particular queue may, for example, produce greater business value than another queue. Value may be measured using any suitable means, such as by monitoring a dynamic value profile (DVP) which may be a function of various financial attributes associated with the current calls in the queue such as revenue per call, cost per call, legal risks, sales volume, or other business attributes. In some embodiments, a service level goal ("SLG") associated with a particular queue may be adjusted in response to the reallocation of agents. Allocating agents according to DVPs associated with queues may result in a higher bottom line value for call centers by ensuring that high value calls are quickly and efficiently connected with an agent.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d, ACD 34a, and call manager 35 with communication network 36a. Accordingly, users of endpoints 32a-32d and ACDs 34a-34d can establish communication sessions between and among each network component coupled for communication with one or more of networks 36a-36c. Communication links 37a and 37b couple communication networks 36a and 36b and communication networks 36a and 36c, respectively. In the illustrated embodiment, communication link 37b is a wide area network (WAN), which couples LANs 36a and 36c. A call admission control (CAC) system 45 may be used to monitor and manage the amount of bandwidth available over WAN 37b.

Communication network 36a includes a plurality of segments 40 and nodes 41 that couple endpoint 32a with ACDs 34b and 34d, gateway 38 and communication networks 36b-36c. Therefore, a user of endpoint 32a is provided with access to endpoints 32b-32d and ACDs 34a-34d. Segments 40 may include a broadband access link, digital subscriber (DSL) link, a T1 link, a fiber optic link, and/or a wireless link. Nodes 41 may include any combination of network components, gatekeepers, call managers, telephony servers, routers, hubs, switches, gateways, endpoints, or other hardware, software, or embedded logic implementing any number of communication protocols that allow for the exchange of packets in communication system 30. Communication network 36a may include any number and combination of segments 40, nodes 41.

Although the illustrated embodiment includes three communication networks 36a-36c, the term "communication network" should be interpreted as generally defining any network capable of transmitting audio and/or video telecommunication signals, data and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d.

Communications over communication networks 36a-36c may use any suitable communication protocol. In a particular embodiment, communication network 36a employs voice communication protocols that allow for the addressing or identification of endpoints, nodes and/or ACDs coupled to communication network 36a. For example, using IP, each of the components coupled together by communication network 36a in communication system 30 may be identified in information directed using IP addresses. In this manner, networks 36a-36c may support any form and/or combination of point-to-point, multicast, unicast, or other techniques for exchanging media packets among components in communication system 30. Thus, any network components capable of exchanging audio, video, or other data using frames or packets, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, at least endpoint 32d, ACDs 34a-34b, call manager 35 and gateway 38 are IP telephony devices. IP telephony devices have the ability of encapsulating a user's voice (or other input) into IP packets so that the voice can be transmitted over communication networks such as network 36a. IP telephony devices may include telephones, fax machines, computers running telephony software, nodes, gateways, wired or wireless devices, hand held personal digital assistants (PDAs), or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP may also transparently supports name mapping and redirection services, which support personal mobility.

Endpoints 32a-32d may represent any suitable combination of hardware, software, and/or encoded logic to provide communication services to a user. For example, endpoints 32a-32d may include a telephone, a computer running telephony software, a video monitor, a camera, an IP phone, a cell phone or any other communication hardware, software and/or encoded logic that supports the communication of packets of media (or frames) using communication network 36a. Endpoints 32a-32d may also include unattended or automated systems, gateways, other intermediate components, or other devices that can establish media sessions.

Call manager 35 includes any combination of hardware, software and/or encoded logic that operates to receive and process calls to facilitate communication among agents and other users of system 30. In particular embodiments, call manager 35 may act as a private branch exchange (PBX) by supporting Internet Protocol (IP) PBX functions, such as hold, park, transfer, redirect and/or other high level and low level call management features. In a particular embodiment, call manager 35 comprises a Voice Over Internet Protocol (VoIP) server that performs the functions of signaling and session management within a packet switched telephony network. The session management functionality of call manager 35 provides the ability to control the attributes of an end-to-end call across multiple networks in communication system 10. For example, in particular embodiments, call manger 35 may support SIP.

It will be recognized by those of ordinary skill in the art that endpoints 32a-32d, ACDs 34a-34d, call manager 35 and/or gateway 38 may be any combination of hardware, software, logic embodied in a computer readable medium, and/or encoded logic that provides communication services to a user. Although FIG. 1 illustrates a particular number and configuration of endpoints, ACDs, segments, nodes, call managers and gateways, communication system 30 contemplates any number or arrangement of such components for communicating media.

Figure 2:
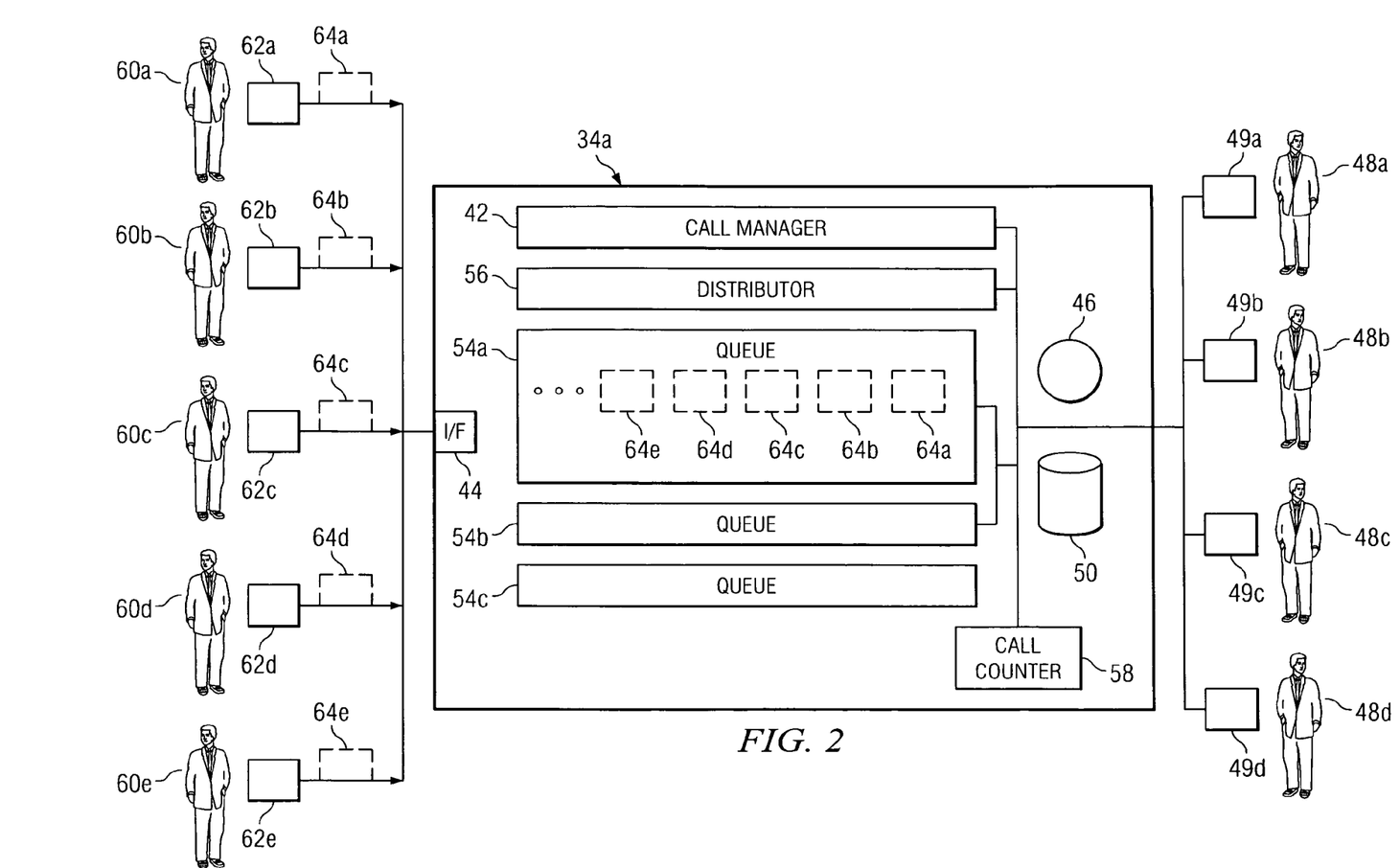
FIG. 2 is a simplified block diagram illustrating an automatic call distributor of FIG. 1 in more detail.

FIG. 2 illustrates ACD 34a in accordance with a particular embodiment of the present invention. In the illustrated embodiment, ACD 34a includes a call manager 42, an interface or input ports 44, a processor 46, memory module 50, queues 54a-54c, a distributor 56 and a call counter 58. Interface or input ports 44 couple ACD 34a with communication network 36a. Processor 46 may work in conjunction with other components of ACD 34a to provide the functionality of ACD 34a discussed herein. Memory module 50 may be any form of volatile or non-volatile memory including, without limitation, magnetic media, optical media, random access memory (RAM), read-only memory (ROM), flash memory, removable media, or any other suitable local or remote memory component. Memory module 50 may store any suitable information necessary to accomplish the ACD functionality described herein.

The illustrated embodiment includes agents 48 associated with ACD 34a. It should be understood that ACDs in accordance with various embodiments may be associated with any suitable number of agents 48. The illustrated embodiment also includes callers 60. Agents 48 may use respective endpoints 49 to communicate with callers to ACD 34a. Callers 60 may use endpoints 62 to communicate with agents 48 associated with ACD 34a. Endpoints 49 and 62 may be similar to one or more of the endpoints described above with respect to FIG. 1, such as IP phone endpoint 32d. It should be understood that endpoints 49 and 62 may be coupled to ACD 34a through one or more communication networks, such as the communication networks described above with respect to FIG. 1 which may include one or more WANs or LANs as indicated above.

Call manager 42 may maintain information on agents 48 and other users of system 30 and may facilitate communication among users. Call manager 42 may be similar to call manager 35 as described with respect to FIG. 1. In particular embodiments, call manager 42 may maintain a listing, table, or other organization information about agents 48 and other users of system 30. The information may include a name or other identifier for each agent 48 and other user. The information may also include contact information such as phone numbers and email addresses for the agents 48 and users. For identifying agents 48a-48d that may be contacted or otherwise recruited to handle incoming calls received by ACD 34a, call manager 42 may also include information identifying whether a user of system 30 is a call agent or performs other tasks within the organization. As is the case with other components of ACD 34a, in particular embodiments the functionality of call manager 42 may be performed by hardware, software, or encoded logic distributed through a communication network coupled with the ACD.

Call counter 58 comprises any suitable software, hardware or encoded logic that keeps track, for example in connection with processor 46, of information associated with calls 64. This information may include, for example, call wait time, number of times a call has been skipped for distribution, call center wait time limits, projected abandon times, tolerance times, and projected agent availability times.

In general, ACD 34a is operable to distribute calls 64 to agents 48 in any suitable manner. The distribution process begins when an incoming call 64 is received through interface 44. At this time, processor 46 may determine if a suitable agent 48 is available to receive an incoming call. If a suitable agent is available to receive the incoming call, distributor 56 distributes the call to such agent for handling. For example, distributor 56 may connect a voice or video call with the available suitable agent. In another example embodiment, the caller 60 may request a service via an e-mail, IM, or other text modality. Accordingly, multimedia contact center agents may be required to simultaneously handle multiple contacts in a variety of contact modalities. If a suitable agent is not available, the call may be placed into a queue 54 in order to wait for an appropriate agent(s). In this embodiment, ACD 34a has three queues 54; however other embodiments of the present invention may have none, one or any suitable number of queues 54. The selection of which queue 54 to place an incoming call may depend on the type of customer making the call, the type of service requested in the call or any other characteristic or condition relating to the call, to the customer, or to ACD 34*a*. While a customer is waiting for an agent, ACD 34*a* may perform one or more of several functions including data collection from the user, playing of pre-recorded messages, or other automated process. As soon as a suitable agent becomes available, distributor 56 distributes the call to the appropriate agent. Once an agent is through handling a call, the agent may be required to perform various tasks such as summarizing any call issues, entering a customer order or any other particular tasks required as a result of the call, the caller, the ACD host or the business to which the call relates.

As indicated, multiple calls 64 and contacts may be placed in a queue 54 awaiting connection with an agent 48. Particular embodiments employ various methods to determine an order in which calls placed in queues are distributed to agents that become available to handle the calls. In a particular embodiment, ACD 34*a* may distribute calls in accordance with a first in first out (FIFO) method. Alternatively, ACD 34*a* may employ a non-FIFO distribution method, thereby dynamically reordering calls 64 in a queue 54. Such methods may be implemented to meet one or more service level goals (SLGs) or commitments of a call center. For purposes of this specification, a SLG may be any benchmark or target associated with connecting an incoming call with an agent. As an example, a SLG may be measured by a percentage of calls that are connected with an agent within a specified time interval. In certain situations, distributing calls in a non-FIFO manner may better permit ACD 34*a* to meet a SLG for a particular queue.

In addition to monitoring SLGs, ACD 34*a* may maintain and monitor a dynamic value profile ("DVP") associated with each queue 54. Generally, a DVP may be an indicator which measures relative value (or conversely, cost) associated with a particular queue 54. More specifically, a DVP may be a function defined by a set of financial attributes associated with a plurality of calls. Particular financial attributes may include, for example, revenue per call, cost per call, legal risk, and sales volume. Thus, unlike a SLG, which is typically static (i.e. remains constant for a particular queue), a DVP may change in accordance with variations in the business attributes it comprises. It should be noted that while specific variables are provided, a dynamic value profile may comprise any suitable number, type, or combination of variables which relate to call processing at a call center.

Each DVP may be managed by a set of business rules enforced by ACD 34*a*. For instance, a business rule might assign weights to certain variables in the DVP function. As an example, if a given business seeks to maximize revenue, then revenue per call might be weighted more heavily than another variable. Alternatively, if inventory of a certain item is particularly high or the business desires to sell off a particular item from its inventory, the business rule(s) may place increased importance on sales volume per call. Additionally, a business rule might weight the DVPs of particular queues. Weighting the actual DVP may allow an enterprise to differentiate high priority queues. To elaborate, if a particular queue has a high call volume because, for example, a new product was released the business rule might specify that the queue for calls related to the new product receive higher priority when allocating agents to answer calls. Likewise, if a new manufacturing problem is discovered regarding a certain product, a business rule may weight the DVP of the queue assigned for calls associated with the problem. Accordingly, in particular embodiments certain business rules may be incorporated into the calculation of a DVP to meet specific demands of an enterprise.

Other business rules may relate sensitivity and/or accuracy associated with calculating a DVP. Accordingly, a particular business rule may govern how frequently a DVP is updated. Such a business rule might provide that a DVP for a particular queue be (re)calculated after each call is answered, after a specified number of calls have been answered or after a certain interval of time has elapsed. A further business rule might specify that the DVP be calculated as a moving average. For instance, the DVP may comprise a sample size of the previous ten, twenty, fifty, or any other number of calls. By altering the sample size, an enterprise may adjust the sensitivity of the DVP calculation. Additional business rules may provide that the high and low (i.e. extreme) values in the DVP calculation sample be excluded as outliers. Although certain business rules are provided, it is envisioned that ACD 34*a* may incorporate any suitable business rule pertaining to the accuracy, sensitivity, and/or reliability of the DVP calculation.

In particular embodiments, ACD 34*a*, for example through processor 45, continuously monitors the DVP associated with each queue 54. Because a DVP for a queue may change in response to any given call, ACD 34*a* may recalculate the DVP for a particular queue 54 after each call 64 has been serviced, or at any other regular or irregular time. To illustrate, during or after a call, an agent 48 may input call data into an endpoint 49. Call data may include, for example, sales volume, item number, price, gross revenue, net revenue, call length, caller location, or any other call-related information. From the call data, ACD 34*a* may extract the necessary business attributes for calculating the DVP. After extracting the relevant business attributes, ACD 34*a* may update the DVP for the queue. As mentioned, ACD 34*a* may maintain a moving average of the DVP such that the call data from any particular call does not produce a substantial fluctuation in the DVP associated with a particular queue.

In operation, ACD 34*a* may reallocate agents 48 assigned to a particular queue 54 according to the DVPs associated with respective queues 54. As an example, ACD 34*a* may compare the DVPs of each of a plurality of queues 54. The comparison may indicate that a particular queue 54 provides greater value than one or more other queues 54. Alternatively, ACD 34*a* may determine that a greater business loss occurs if callers from a particular queue opt out (i.e. hang-up). In either situation, ACD 34*a* may reallocate agents 48 to answer calls in the relevant queue(s). In a particular embodiment, ACD 34*a* may reallocate agents 48 to achieve maximum bottom line value, as measured by DVPs, at a call center. To maximize value across a plurality of queues, ACD 34*a* may employ any suitable algorithm for optimizing the allocation of agents 48. For purposes of this specification a reallocation may reference the redistribution or reassignment of agents 48 among queues 54 and/or the redistribution or reassignment of calls 64 to agents 48.

In addition to reallocating agents 48, ACD 34*a* may dynamically adjust SLGs associated with queues. In certain situations, reallocating agents 48 to accommodate more valuable queues may require moving agents from queues that are not currently meeting their respective SLGs. Likewise, reallocating agents may also require moving agents from a queue that is currently meeting a SLG but that will not meet the current SLG if one or more agents are moved from the queue. To resolve this conflict, ACD 34*a* may dynamically adjust a SLG so that a queue may meet a SLG in response to a reallocation of agents or in response to a change in a DVP for a particular queue. For example, assume that the SLG for queue 54*c* requires connecting eighty percent of calls with an agent in thirty seconds. Further assume that the current DVP for queue 54*c* is lower than the value of the DVP for queue 54*a*. In this situation, if ACD 34*a* determines that greater value will be realized by reallocating agents from queue 54*c* to queue 54b, ACD 34a may also adjust the SLG for queue 54c so that it may be satisfied. In particular, ACD 34a may increase the allotted time interval for answering calls and/or decrease the required percentage of calls which must be answered in the allotted time interval to satisfy the SLG.

In certain embodiments, ACD 34a may provide historical reporting that shows the number of agents which have been reallocated from one queue to another. Additionally, ACD 34a may also report and store, for example in memory module 50, the DVP of each queue at the time of the reallocation. In further embodiments, ACD 34a may continuously perform data mining on historical and real time (within a certain time window) data to evaluate the DVP of a queue with the entire bottom line value produced by a call center.

To further illustrate the capabilities of ACD 34a the following example is provided wherein during a given interval the SLG for each of queues 54a-54c is satisfied. Accordingly, calls are currently being connected with agents 48 at the respective target level for each queue 54a-54c. Further assume that the value of the DVP associated with queue 54a is greater than the value of the DVP associated with queues 54b and 54c. Because the DVP for queue 54a is greater than the respective DVPs for queues 54b and 54c, each call that is answered from queue 54a provides greater value (or alternatively, each caller that opts out provides a greater business loss) than calls in queues 54b and 54c. Therefore, even though the SLG is currently satisfied for each queue, reallocating agents from queue 54c and/or queue 54b to queue 54a may increase business value to the call center. Thus, in this situation, ACD 34a may provide queue 54a with additional agents in order to maximize the business value produced by the call center.

To contrast the previous scenario, the following example is provided wherein a SLG for one of the queues is not currently satisfied. In this example, assume that a surge of calls enter queue 54a and it is unable to meet its SLG. Upon detecting this situation, ACD 34a may calculate the DVPs for each of the queues in the system. In a particular embodiment, the DVP calculation is performed in response to detecting a missed SLG and prior to reallocating agents to remedy the missed SLG. For example, suppose queue 54a has a high DVP and queues 54b-54c have relatively equivalent DVPs to each other, but are much lower than queue 54a. In this situation, ACD 34a may reallocate agents from queue 54b and/or queue 54c to queue 54a in order to maximize business value within the call center. However, if the DVP for queue 54a indicates that the surge of calls did not generate any additional value, ACD 34a may determine not to reallocate agents to meet the SLG for queue 54a. In either of the described situations, ACD 34a may also adjust the SLG for any of queues 54a-54c in response to a reallocation of agents, a failure to meet a SLG, and/or a change in the DVP for a particular queue.

It will be recognized by those of ordinary skill in the art that ACD 34a is merely one example configuration of an ACD for handling calls in accordance with particular embodiments. ACD 34a may include any number of interfaces, call managers, processors, memory modules, distributors, queues and call counters to accomplish the functionality and features described herein. For example, although ACD 34a is illustrated and described as including call manager 42, interface 44, processor 45, memory module 50, queues 54a-54c, distributor 56, and call counter 58, these components and other desired components for performing the above described functionality may be centrally located (local) with respect to one another, or distributed throughout communication system 30. In addition, one or more components of ACD 34a may work together in performing various functionality described herein. For example, distributor 56 and processor 46 may work together to distribute calls to agents.

Figure 3:
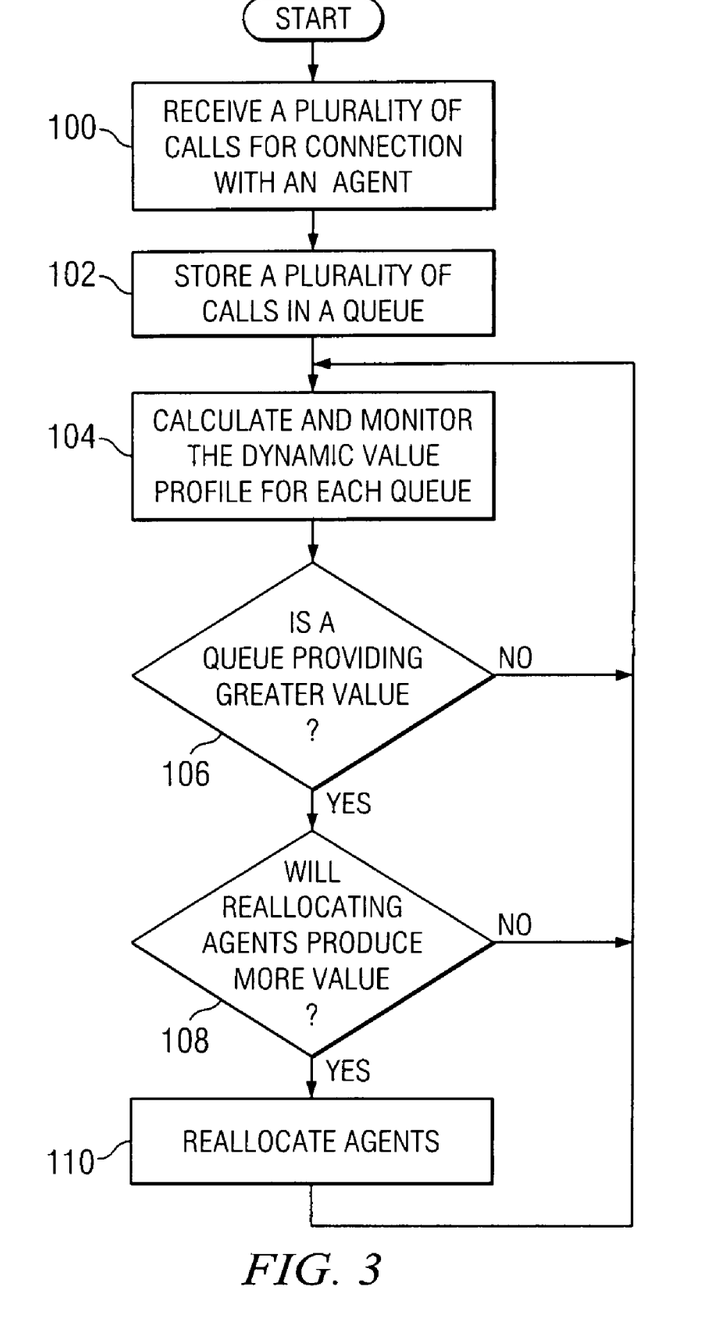
FIG. 3 is a flow chart illustrating a method for managing calls in accordance with an embodiment of the present invention.

FIG. 3 is a flowchart illustrating a method for managing calls at a call center in accordance with a particular embodiment. The method begins at step 100 where a plurality of calls are received at a call center. Each call is for connection with one of a plurality of agents and each may be received at separate times. At step 102, the plurality of calls are stored in a plurality of queues to wait for available agents to receive the calls. At step 104, the DVP for each queue is calculated and monitored.

At step 106 the ACD determines whether a particular queue is providing greater value to the call center than other queues. This determination may be made by comparing the DVPs of each queue. If a queue has a higher DVP than another queue, then it is providing greater value. If the queues have relatively equivalent DVPs, then the process returns to step 104 and the ACD continues to monitor the DVP for each queue.

If a queue is providing greater value than other queues, then the ACD may determine whether reallocating agents will produce more value at the call center at step 108. If bottom line business value will not increase by a reallocation of agents, then the process returns to step 104. Alternatively, if the ACD determines that value produced by the call center may be increased by reallocating agents, then the ACD may, at step 110, reallocate agents. In a particular embodiment, the ACD may optimally allocate the pool of agents to achieve maximum business value for the call center while maintaining a SLG for each queue. Alternatively, the ACD may determine that maintaining a certain SLG in a particular queue is less of a priority than maximizing business value from another queue. In this situation, the ACD may adjust the SLG in the non-priority queue so that more agents may be allocated to the queue with the higher DVP. After reallocating agents, the system may return to step 104 and continue to monitor the DVP for each queue.

One skilled in the art will readily recognize that some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments include utilizing a dynamic value profile to maximize the bottom line value produced by a call center. The dynamic value profile may be a function of variables including, but not limited to, sales volume, revenue per call, cost per call, and/or legal risk associated with the call. In particular embodiments, calculating a dynamic value profile may be governed by a set of business rules which may weight certain variables or queues. To maximize value, an ACD may allocate and/or reallocate agents to service queues providing greater business value. The allocation of agents may be performed independently of underlying SLGs for particular queues. Additionally, in certain embodiments, the ACD may determine an optimal distribution of agents among all queues to maximize the bottom line value for the call center.

Although particular embodiments have been described in detail with reference to particular embodiments, it should be understood that various other changes, substitutions, and alterations may be made hereto without departing from the spirit and scope of the present invention. For example, although the present invention has been described with reference to a number of elements included within communication system 30 and ACD 34a, these elements may be combined, rearranged or positioned in order to accommodate particular routing architectures or needs. In addition, any of these elements may be provided as separate external components to communication system 30, ACD 34a or each other where appropriate. Particular embodiments contemplate great flexibility in the arrangement of these elements as well as their internal components.

It should be understood that the architecture and functionality of ACDs and call centers described above is applicable generally to all call or contact centers that operate to answer incoming calls and identify appropriate agents to receive the calls. Accordingly, the described ACDs may include those call or contact centers that are located within an enterprise and are staffed by enterprise employees. ACDs implementing various functionality described herein are not intended to be limited to hosted and outsourced call or contact centers. As indicated, particular embodiments may be implemented in any contact center, such as one receiving phone calls e-mail, IM, video, or any combination of multimedia contacts.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for managing calls, comprising:
   allocating a plurality of agents among a plurality of queues;
   receiving a plurality of calls each for connection with at least one of the plurality of agents;
   assigning each of the plurality of calls to a queue of the plurality of queues;
   monitoring a dynamic value profile for each of the plurality of queues, the dynamic value profile for a queue calculated based on one or more financial attributes of the current calls in the queue;
   determining that the dynamic value profile for a first queue is greater than the dynamic value profile for a second queue;
   reallocating one or more of the plurality of agents, among the plurality of queues in response to determining that the dynamic value profile for the first queue is greater than the dynamic value profile for the second queue;
   monitoring a service level goal, the service level goal associated with one or more of the plurality of queues;
   determining that the service level goal is not satisfied; and
   wherein reallocating one or more of the plurality of agents comprises reallocating one or more of the plurality of agents in response to determining that the service level goal is not satisfied.

2. The method of claim 1, further comprising reassigning one or more of the plurality of calls to another one of the plurality of queues in response to determining that the dynamic value profile for the first queue is greater than the dynamic value profile for the second queue.

3. The method of claim 1, wherein the dynamic value profile is based on one or more of:
   revenue per call;
   cost per call;
   legal risk; or
   sales volume.

4. The method of claim 1, further comprising adjusting the service level goal in response to determining that the dynamic value profile for a first queue is greater than the dynamic value profile for a second queue.

5. The method of claim 1, further comprising
   calculating the dynamic value profile for each of the plurality of queues in response to determining that the service level goal is not satisfied.

6. The method of claim 1, wherein reallocating one or more of the plurality of agents comprises:
   calculating a dynamic value profile for each of the plurality of queues;
   determining an allocation of the plurality of agents determined to optimize the dynamic value profiles for the plurality of queues; and
   allocating the plurality of agents according to the allocation of the plurality of agents.

7. The method of claim 1, wherein monitoring a dynamic value profile for each of a plurality of queues comprises calculating the dynamic value profile for each of the plurality of queues after a given time interval.

8. The method of claim 1, further comprising recalculating the dynamic value profile for each of the plurality of queues in response to reallocating one or more of the plurality of agents.

9. The method of claim 1, wherein the financial attributes of the current calls in a queue on which the dynamic value profile calculation is based comprise characteristics other than a number of calls in the queue.

10. A system for managing calls, comprising:
    an interface operable to receive a plurality of calls for connection with at least one of a plurality of agents;
    a distributor coupled to the interface and operable to distribute the plurality of calls to the plurality of agents; and
    a processor coupled to the distributor and operable to:
      allocate a plurality of agents among a plurality of queues;
      assign each of the plurality of calls to a queue of the plurality of queues;
      monitor a dynamic value profile for each of the plurality of queues, the dynamic value profile for a queue calculated based on one or more financial attributes of the current calls in the queue;
      determine that the dynamic value profile for a first queue is greater than the dynamic value profile for a second queue;
      reallocate one or more of the plurality of agents among the plurality of queues in response to determining that the dynamic value profile for the first queue is greater than the dynamic value profile for the second queue;
      monitor a service level goal, the service level goal associated with one or more of the plurality of queues;
      determine that the service level goal is not satisfied; and
      wherein a processor operable to reallocate one or more of the plurality of agents comprises a processor operable to reallocate one or more of the plurality of agents in response to determining that the service level goal is not satisfied.

11. The system of claim 10, wherein the processor is further operable to reassign one or more of the plurality of calls to another one of the plurality of queues in response to determining that the dynamic value profile for the first queue is greater than the dynamic value profile for the second queue.

12. The system of claim 10, wherein the dynamic value profile is based on one or more of:
    revenue per call;
    cost per call;
    legal risk; or
    sales volume.

13. The system of claim 10, wherein the processor is further operable to adjust the service level goal in response to determining that the dynamic value profile for a first queue is greater than the dynamic value profile for a second queue.

14. The system of claim 10, wherein the processor is further operable to
calculate the dynamic value profile for each of the plurality of queues in response to determining that the service level goal is not satisfied.

15. The system of claim 10, wherein a processor operable to reallocate one or more of the plurality of agents comprises a processor operable to:
calculate a dynamic value profile for each of the plurality of queues;
determine an allocation of the plurality of agents determined to optimize the dynamic value profile for the plurality of queues; and
allocate the plurality of agents according to the allocation of the plurality of agents which optimizes the dynamic value profile for the plurality of queues.

16. The system of claim 10, wherein a processor operable to monitor a dynamic value profile for each of the plurality of queues comprises processor operable to calculate the dynamic value profile for each of the plurality of queues after a given time interval.

17. The system of claim 10, wherein the processor is further operable to recalculate a dynamic value profile for each of the plurality of queues in response to reallocating one or more of the plurality of agents.

18. Logic embodied in a non-transitory computer readable medium, the computer readable medium comprising code operable to:
allocate a plurality of agents among a plurality of queues;
receive a plurality of calls each for connection with at least one of the plurality of agents;
assign each of the plurality of calls to a queue of the plurality of queues;
monitor a dynamic value profile for each of the plurality of queues, the dynamic value profile for a queue calculated based on one or more financial attributes of the current calls in the queue;
determine that the dynamic value profile for a first queue is greater than the dynamic value profile for a second queue;
reallocate one or more of the plurality of agents among the plurality of queues in response to determining that the dynamic value profile for the first queue is greater than the dynamic value profile for the second queue;
monitor a service level goal, the service level goal associated with one or more of the plurality of queues;
determine that the service level goal is not satisfied; and
wherein code operable to reallocate one or more of the plurality of agents comprises code operable to reallocate one or more of the plurality of agents in response to determining that the service level goal is not satisfied.

19. The logic of claim 18, wherein the code is further operable to reassign one or more of the plurality of calls to another one of the plurality of queues in response to determining that the dynamic value profile for the first queue is greater than the dynamic value profile for the second queue.

20. The logic of claim 18, wherein the dynamic value profile is based on one or more of:
revenue per call;
cost per call;
legal risk; or
sales volume.

21. The logic of claim 18, wherein the code is further operable to adjust the service level goal in response determining that the dynamic value profile for a first queue is greater than the dynamic value profile for a second queue.

22. The logic of claim 18, wherein the code is further operable to
calculate the dynamic value profile for each of the plurality of queues in response to determining that the service level goal is not satisfied.

23. The logic of claim 18, wherein code operable to reallocate one or more of the plurality of agents comprises code operable to:
calculate a dynamic value profile for the plurality of queues;
determine an allocation of the plurality of agents determined to optimize the dynamic value profile for the plurality of queues; and
allocate the plurality of agents according to the allocation of the plurality of agents which optimizes the dynamic value profile for the plurality of queues.

24. The logic of claim 18, wherein code operable to monitor a dynamic value profile for each of the plurality of queues comprises code operable to calculate the dynamic value profile for each of the plurality of queues after a given time interval.

25. The logic of claim 18, wherein the code is further operable to recalculate a dynamic value profile for each of the plurality of queues in response to reallocating one or more of the plurality of agents.

26. A system for managing calls, comprising:
means for allocating a plurality of agents among a plurality of queues;
means for receiving a plurality of calls each for connection with at least one of the plurality of agents;
means for assigning each of the plurality of calls to a queue of the plurality of queues;
means for monitoring a dynamic value profile for each of the plurality of queues, the dynamic value profile for a queue calculated based on one or more financial attributes of the current calls in the queue;
means for determining that the dynamic value profile for a first queue is greater than the dynamic value profile for a second queue;
means for reallocating one or more of the plurality of agents among the plurality of queues in response to determining that the dynamic value profile for the first queue is greater than the dynamic value profile for the second queue;
means for monitoring a service level goal, the service level goal associated with one or more of the plurality of queues;
means for determining that the service level goal is not satisfied; and
wherein means for reallocating one or more of the plurality of agents comprises means for reallocating one or more of the plurality of agents in response to determining that the service level goal is not satisfied.

* * * * *